United States Patent
Lam et al.

(10) Patent No.: US 9,292,352 B2
(45) Date of Patent: Mar. 22, 2016

(54) SYSTEMS AND METHODS FOR CLOUD MANAGEMENT

(75) Inventors: Anthony Lam, Fremont, CA (US); Lars Trieloff, Potsdam (DE); Pierre Tager, San Francisco, CA (US); Heidi Chen, San Jose, CA (US); Joseph Lee, San Jose, CA (US); Alexander Klimetschek, Berlin (DE)

(73) Assignee: Adobe Systems Incorporated, San Jose, CA (US)

( * ) Notice: Subject to any disclaimer, the term of this patent is extended or adjusted under 35 U.S.C. 154(b) by 191 days.

(21) Appl. No.: 13/572,330

(22) Filed: Aug. 10, 2012

(65) Prior Publication Data

US 2014/0047434 A1  Feb. 13, 2014

(51) Int. Cl.
  G06F 9/445 (2006.01)
  G06F 15/173 (2006.01)
  G06F 3/00 (2006.01)
  G06F 9/50 (2006.01)

(52) U.S. Cl.
  CPC .............. G06F 9/5072 (2013.01); G06F 8/61 (2013.01); *G06F 9/44505* (2013.01)

(58) Field of Classification Search
  CPC .............. G06F 8/60; G06F 8/61; G06F 8/65; G06F 9/445; G06F 15/16
  See application file for complete search history.

(56) References Cited

U.S. PATENT DOCUMENTS

| 7,788,521 B1 | 8/2010 | Sim-Tang |
| 8,296,434 B1 | 10/2012 | Miller et al. |
| 8,572,602 B1 | 10/2013 | Colton et al. |
| 8,595,328 B2 * | 11/2013 | Murakami et al. ............ 709/219 |
| 9,021,009 B2 * | 4/2015 | Van Biljon et al. ........... 709/201 |
| 2003/0051236 A1 * | 3/2003 | Pace et al. ..................... 717/177 |
| 2003/0105810 A1 | 6/2003 | McCrory et al. |
| 2007/0078988 A1 | 4/2007 | Miloushev et al. |
| 2009/0276771 A1 | 11/2009 | Nickolov et al. |
| 2009/0293056 A1 | 11/2009 | Ferris |
| 2009/0300151 A1 | 12/2009 | Friedman et al. |
| 2010/0088205 A1 | 4/2010 | Robertson |
| 2010/0131649 A1 | 5/2010 | Ferris |
| 2010/0223378 A1 | 9/2010 | Wei |

(Continued)

FOREIGN PATENT DOCUMENTS

CN  202565304 U  11/2012

OTHER PUBLICATIONS

Dejun et al., "Resource Provisioning of Web Applications in Heterogeneous Clouds", Proceedings of the 2nd USENIX conference on Web application development, 2011, 12 pages.

(Continued)

*Primary Examiner* — Li B Zhen
*Assistant Examiner* — Mohammad Kabir
(74) *Attorney, Agent, or Firm* — Kilpatrick Townsend & Stockton LLP (57) ABSTRACT

Systems and methods for cloud management are disclosed. For example, one disclosed method includes the steps of receiving access information for a cloud service provider; receiving configuration information for a cloud instance; receiving a command to create the cloud instance; requesting and receiving a node from the cloud service provider; causing the node to be configured as a cloud node, comprising causing a software package to be installed and configured on the cloud node; configuring the cloud instance and incorporating the node into the cloud instance; and providing access to the cloud instance.

11 Claims, 8 Drawing Sheets

(56) References Cited

U.S. PATENT DOCUMENTS

| | | | |
|---|---|---|---|
| 2010/0274762 A1* | 10/2010 | Murphy et al. ............... 707/636 |
| 2010/0281166 A1* | 11/2010 | Buyya et al. ................... 709/226 |
| 2010/0299366 A1 | 11/2010 | Stienhans et al. |
| 2011/0016214 A1 | 1/2011 | Jackson |
| 2011/0022658 A1* | 1/2011 | Pace et al. ..................... 709/204 |
| 2011/0029675 A1 | 2/2011 | Yeow et al. |
| 2011/0078303 A1 | 3/2011 | Li et al. |
| 2011/0138050 A1 | 6/2011 | Dawson et al. |
| 2011/0225107 A1 | 9/2011 | Khosravy |
| 2011/0252432 A1 | 10/2011 | Sim-Tang et al. |
| 2011/0295986 A1 | 12/2011 | Ferris et al. |
| 2011/0296303 A1* | 12/2011 | Duquene et al. ............... 715/704 |
| 2011/0320444 A1 | 12/2011 | Yehaskel et al. |
| 2011/0320605 A1 | 12/2011 | Kramer et al. |
| 2011/0321031 A1* | 12/2011 | Dournov et al. ............... 717/171 |
| 2012/0005359 A1 | 1/2012 | Seago et al. |
| 2012/0017112 A1 | 1/2012 | Broda et al. |
| 2012/0047443 A1 | 2/2012 | Tarkoma |
| 2012/0096165 A1 | 4/2012 | Madduri et al. |
| 2012/0102572 A1* | 4/2012 | Murakami et al. ............... 726/28 |
| 2012/0110394 A1* | 5/2012 | Murakami et al. ............... 714/48 |
| 2012/0179824 A1 | 7/2012 | Jackson |
| 2012/0185913 A1 | 7/2012 | Martinez et al. |
| 2012/0198073 A1 | 8/2012 | Srikanth et al. |
| 2012/0204169 A1 | 8/2012 | Breiter et al. |
| 2012/0222106 A1 | 8/2012 | Kuehl |
| 2012/0233118 A1 | 9/2012 | Holt et al. |
| 2012/0240243 A1 | 9/2012 | Allardyce |
| 2012/0259982 A1 | 10/2012 | Tatsubori et al. |
| 2012/0266159 A1* | 10/2012 | Risbood et al. ............... 717/177 |
| 2012/0296980 A1* | 11/2012 | Pace et al. ..................... 709/205 |
| 2012/0297059 A1 | 11/2012 | Bross |
| 2012/0311156 A1 | 12/2012 | Dejana et al. |
| 2012/0324070 A1* | 12/2012 | Campion et al. ............... 709/223 |
| 2013/0036091 A1 | 2/2013 | Provenzano et al. |
| 2013/0054221 A1* | 2/2013 | Artzi et al. ..................... 703/22 |
| 2013/0080603 A1 | 3/2013 | Simons et al. |
| 2013/0091557 A1 | 4/2013 | Gurrapu |
| 2013/0111260 A1 | 5/2013 | Reddy et al. |
| 2013/0152078 A1 | 6/2013 | Arcilla et al. |
| 2013/0179560 A1* | 7/2013 | Kumar et al. .................. 709/224 |
| 2013/0198368 A1* | 8/2013 | Patterson et al. ............... 709/224 |
| 2013/0227558 A1 | 8/2013 | Du et al. |
| 2013/0291126 A1 | 10/2013 | Thomson, David G. |
| 2013/0297738 A1 | 11/2013 | Tarkoma, Sasu |
| 2013/0304923 A1 | 11/2013 | Clay et al. |
| 2014/0047342 A1 | 2/2014 | Breternitz et al. |

OTHER PUBLICATIONS

Sun et al., "Simplifying Service Deployment with Virtual Appliances", 2008 IEEE International Conference on Services Computing, IEEE, 2008, 8 pages.

Chaczko et al., "Availability and Load Balancing in Cloud Computing", 2011 International Conference on Computer and Software Modeling, IPCSIT vol. 14, 2011, pp. 134-140.

Dias et al., "A Scalable and Highly Available Web Server", Compcon 1996, IEEE, 1996, 8 pages.

Baun et al., "A Taxonomy Study on Cloud Computing Systems and Technologies", Cloud Computing, CRCnet (Oct. 2011), ch. 4, pp. 73-90.

Hacker, "Toward a Reliable Cloud Computing Service, Cloud Computing and Software Services Theory and Techniques", CRCnet (Jul. 2010), ch. 6, pp. 139-152.

Non Final Office Action in Related U.S. Appl. No. 13/572,321 dated Jul. 21, 2015, 47 pages.

* cited by examiner

SYSTEMS AND METHODS FOR CLOUD MANAGEMENT

FIELD

The present disclosure generally relates to cloud computing and more specifically relates to cloud management.

BACKGROUND

Cloud computing has become a more prevalent technology and provides users with computing functionality or data storage as a service, rather than via the purchase of a software application or computer hardware. Users are typically provided with access to the desired functionality over a network connection to a cloud service provider (CSP), which offers the desired services to the user. For example, a user may obtain storage space within a cloud environment, typically by purchasing access rights to the storage space from a CSP, though a user may construct and configure his own cloud environment. The user may then use the storage space by accessing the cloud environment rather than a specific server. The CSP typically manages the details of where data is physically stored, maintaining storage quotas, and performing data backups. Cloud environments provide advantages in that the service(s) requested by the user may be accessed from multiple locations and may provide a more cost-effective way to add redundant data storage or computing capacity.

SUMMARY

Embodiments according to the present disclosure provide systems and methods for cloud management. For example, one disclosed embodiment is a method comprising receiving access information for a cloud service provider; receiving configuration information for a cloud instance; receiving a command to create the cloud instance; requesting and receiving a node from the cloud service provider; causing the node to be configured as a cloud node, comprising causing a software package to be installed and configured on the cloud node; configuring the cloud instance and incorporating the node into the cloud instance; and providing access to the cloud instance. In another embodiment, a computer-readable medium comprises program code for causing one or more processors to execute such a method.

These illustrative embodiments are mentioned not to limit or define the disclosure, but rather to provide examples to aid understanding thereof. Illustrative embodiments are discussed in the Detailed Description, which provides further description of the disclosure. Advantages offered by various embodiments of this disclosure may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIGS. 1-2B shows a system for cloud management according to one embodiment;

DETAILED DESCRIPTION

Example embodiments are described herein in the context of systems and methods for cloud management. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

Illustrative Method for Cloud Management

According to one illustrative embodiment, a user may easily create, install, configure, and deploy a cloud instance for web content creation and publication using nodes provided by a cloud provider. For example, a user may log into a system for cloud management (referred to as a "cloud manager") according to one embodiment of this disclosure. After logging in, the user may supply access credentials for the user's account with a cloud service provider (CSP), such as a login name and a password, CSP's secret key, access key, or application programming interface (API) key. Once the cloud manager confirms the access credentials with the CSP, the user is presented with an option, such as a button, to create a new cloud instance. When the user clicks the button, the cloud manager begins the process of creating a new cloud instance.

First, the system transmits a request to the CSP for three nodes within the CSP's cloud environment. After the CSP selects and provides access information, such as network addresses, for the three nodes, the cloud manager accesses a separate node within the CSP's cloud environment on which software for creating a cloud instance resides. The cloud manager then causes the software to be copied to each of the three nodes provided by the CSP. Once the copy process is complete, the cloud manager installs the software on each of the nodes. The cloud manager then identifies one node to be configured as an "authoring" node, one node to be a "publisher" node, and one node to be a "dispatcher" node, and executes different sets of installation scripts on each of the three nodes to appropriately configure each of the nodes. In this embodiment, the authoring node will include software and tools to allow a user to develop and test new web content, such as new websites or web applications. The publisher node provides access to web content developed on an authoring node that has been "published" and made available for use on the Internet. The dispatcher node provides load balancing, filtering, security, and/or caching functionality. For example, if the cloud instance is later expanded to include multiple publisher nodes to accommodate increased traffic to a web site, the dispatcher can provide load balancing between the multiple publisher nodes.

After the installation scripts have executed, the cloud manager installs and compiles java server pages (JSP) on each of the nodes and installs other functionality, such as JavaScript, JavaScript Object Notation (JSON), or asynchronous JavaScript and XML (AJAX) features and a cloud manager agent package onto each of the nodes for providing monitoring, diagnostic, and backup functionality for each of the nodes. Finally, the cloud manager ensures that each of the installations completed successfully and provides information to each of the nodes to couple them to each other. Finally, the cloud manager provides a notification to the user that the cloud instance has been created and is available to be used.

Figure 2A:
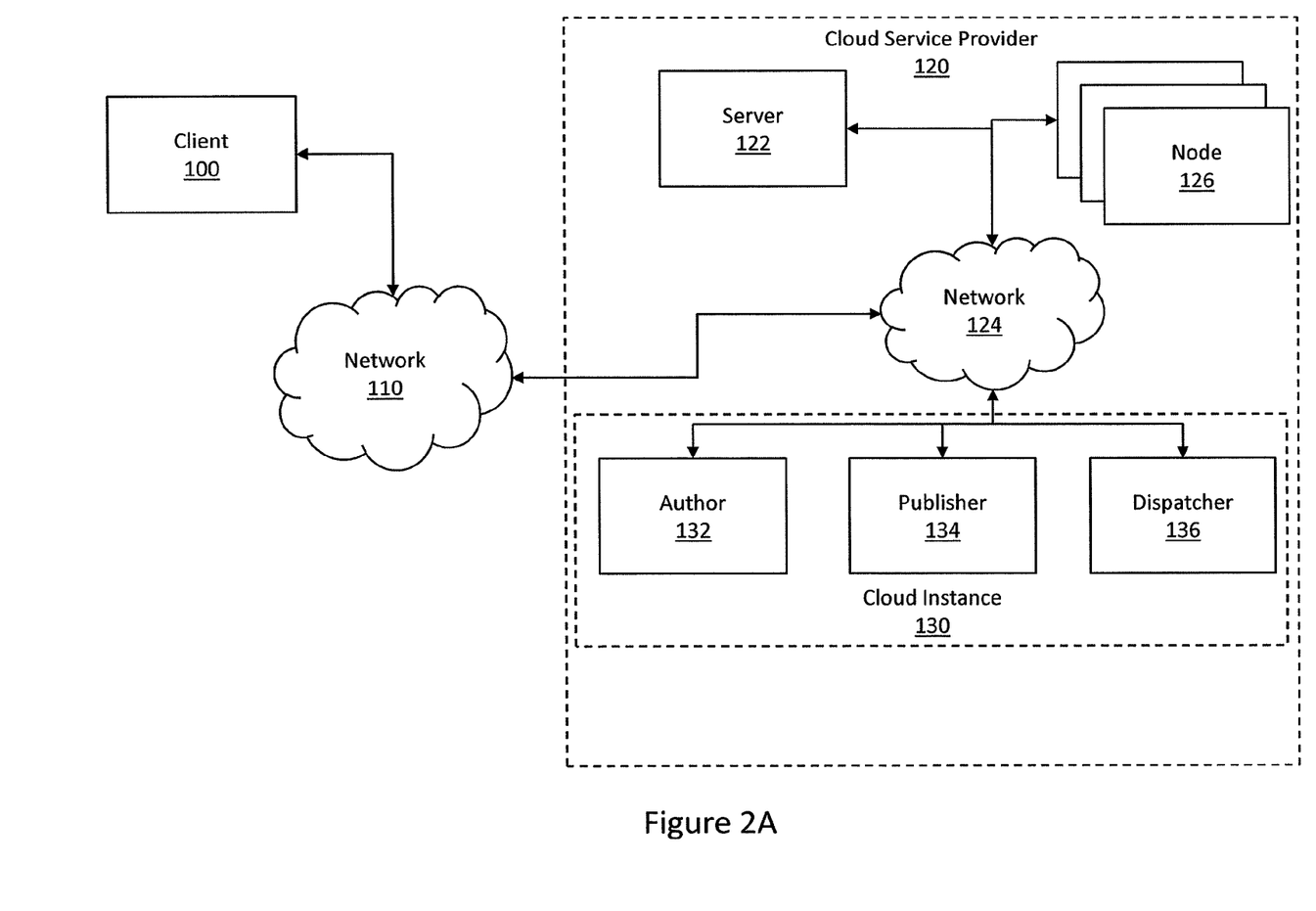

In this illustrative embodiment, the resulting cloud instance 130 is shown in FIG. 2A. As can be seen, the cloud instance comprises three nodes: author node 132, publisher node 134, and dispatcher node 136. After the cloud instance 130 is established, each of these is thus available to the user for authoring and publishing web content.

This illustrative example is given to introduce the reader to the general subject matter discussed herein and this disclosure is not limited to this example. The following sections describe various additional non-limiting embodiments and examples of devices, systems, and methods for cloud management.

Figure 1A:
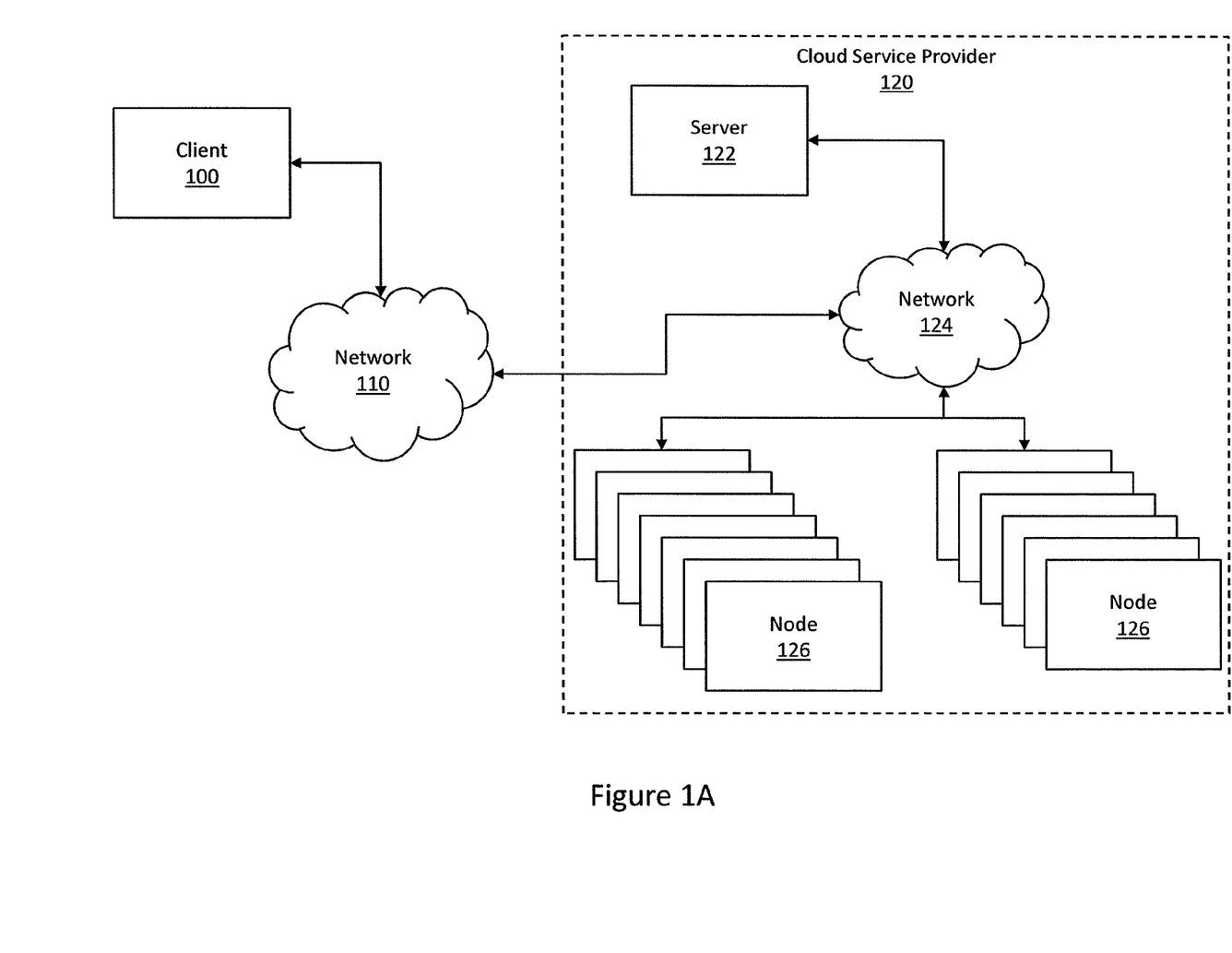

Referring now to FIG. 1A, FIG. 1A shows a system 100 for cloud management according to one embodiment. In the embodiment shown, the system 100 comprises a client computer 100 that is in communication with a CSP 120 over network 110, which is in communication within a network 124 internal to the CSP. The client computer 100 comprises a processor and a computer-readable medium (not shown). The client computer's processor is in communication with the computer-readable medium and is configured to execute program code stored thereon. For example, in this embodiment, the client computer's processor is configured to execute a standard web browser stored in the processor's computer-readable medium. However, in some embodiments, the client computer's processor may be configured to execute a locally-installed software application for cloud management.

The client computer 100 is in communication with the CSP 120 via network 110. In this embodiment the network 110 comprises the Internet; however in other embodiments, the network 110 may comprise any type of network, including local area networks (LANs) and wide area networks (WANs). The network 110 is in communication with the CSP's internal network 124. In this embodiment, the CSP network 124 comprises a LAN, but in other embodiments, the CSP network 124 may comprise any type of network, such as those discussed above. In some embodiments, the CSP network 124, or network 110 or both, may comprise a virtual network, such as a virtual private network (VPN). In some embodiments, the client computer 110 may be directly coupled to the CSP network 124 without the use of another network 110. For example, in one embodiment, a company may provide its own cloud environment on its own internal network 124. In one such embodiment, the cloud environment is made available to one or more client computers 110 located on the same network 124.

Figure 1B:
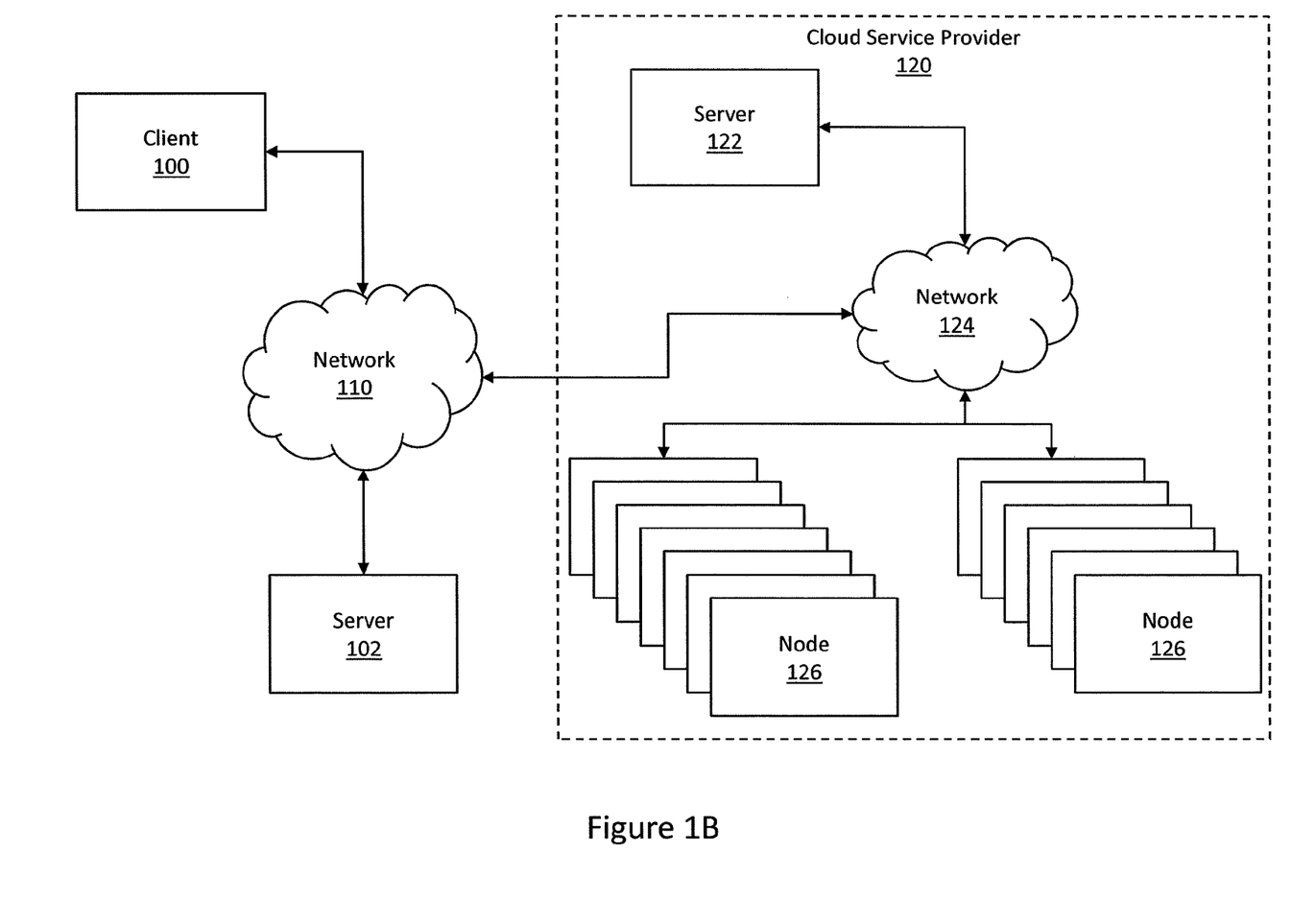
Figure 1C:
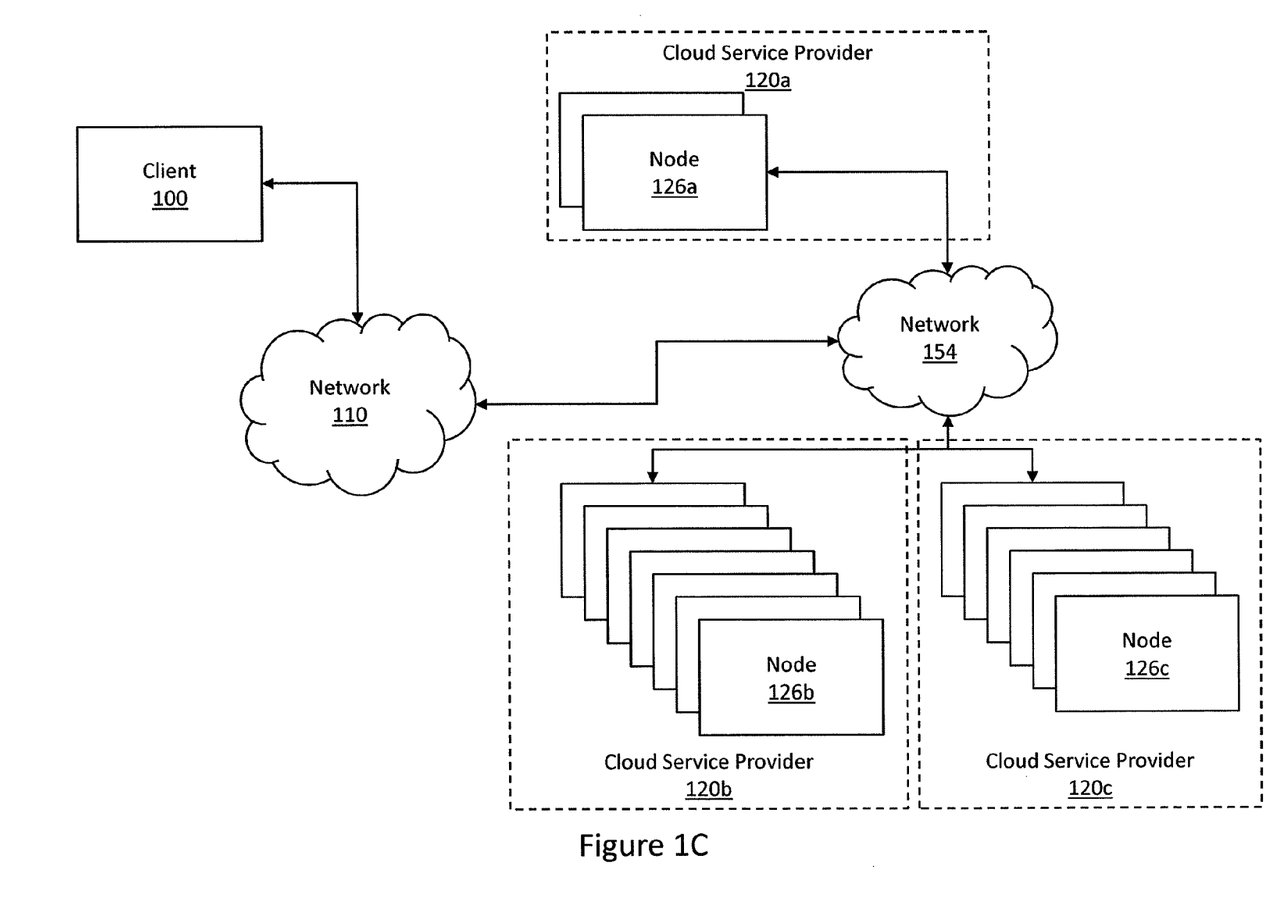

In the embodiment shown in FIG. 1A, the CSP 120 includes a server 122, CSP network 124, a plurality of nodes 126. The server 122 is configured to receive communication requests from the client computer 100 and to serve as an interface between the client computer 100 and the CSP 120. For example, in one embodiment, a user may execute a web browser on the client computer 100 and navigate to a web page provided by the CSP 120 that resides on server 122 that includes a web application embodying one embodiment according to the present disclosure. In another embodiment, a web application is hosted by a third-party service provider, such as on server 102 as shown in FIG. 1B. In one such embodiment, the third party service provider provides a web application for cloud management, which interfaces with one or more CSPs to perform one or more functions or method steps as discussed herein. In the embodiment shown in FIG. 1C, a user may select a CSP from a plurality of CSPs 120a-c at which to create a cloud instance. For example, three CSPs 120a-c may be available and the user may select CSP 120b as the CSP to host a cloud instance.

In a web-based embodiment, as the user works in the web application, a server, such as server 102 or server 122, may issue one or more commands or requests to a cloud instance, or the server 102, 122 may transfer the connection from the client computer 100 to one or more of the nodes within a cloud instance.

The CSP also provides a plurality of nodes 126 for use by a user. In the embodiment shown in FIG. 1A, a node comprises a discrete computing unit that includes processing capabilities, memory in which to execute one or more applications, and non-volatile storage for persistent storage of data or applications. For example, in one embodiment a node may comprise a discrete physical computer having one or more microprocessors, a quantity of random access memory (RAM), and one or more hard drives. In one embodiment, a node may comprise one of a plurality of virtual servers executing within a single physical computer, where each of the plurality of virtual servers is provided with access to one or more microprocessors, a quantity of RAM, and storage space on one or more hard drives. In some embodiments, a node may be provided by a plurality of physical computers that have been linked together, such as in a cluster. In some embodiments, non-volatile storage for a node may be provided in a separate dedicated storage device, such as within a physical computer having a large quantity of persistent storage or within a storage area network. Still further embodiments of suitable nodes comprise one or more combinations of processing capability, memory for application execution, and memory for persistent storage.

Further, nodes within the CSP's cloud environment may not be identically configured. For example, the CSP 120 may provide a variety of different nodes that may have different configurations. For example, in one embodiment, a CSP 120 may offer three different types of nodes (e.g. small, medium, and large) with increasing amounts of processing capacity, application memory, and persistent storage. Some embodiments may comprise other types of nodes or node combinations. In some embodiments, a CSP may allow a user to select one or more geographic regions in which to configure one or more cloud instances, such as North America, Europe, etc. Such functionality may allow a user to select regions suitable for the anticipated use of the cloud instance or cloud instances.

In the embodiment shown in FIG. 1A and as discussed above, a node represents a discrete computing unit with certain characteristics. A node that is idle and has not been allocated to one of the CSP's customers is available for allocation to a customer and for being configured by the customer for the customer's particular needs. Thus, the CSP 120 may provide readily available, scalable, configurable processing capabilities for one or more customers.

Figure 2B:
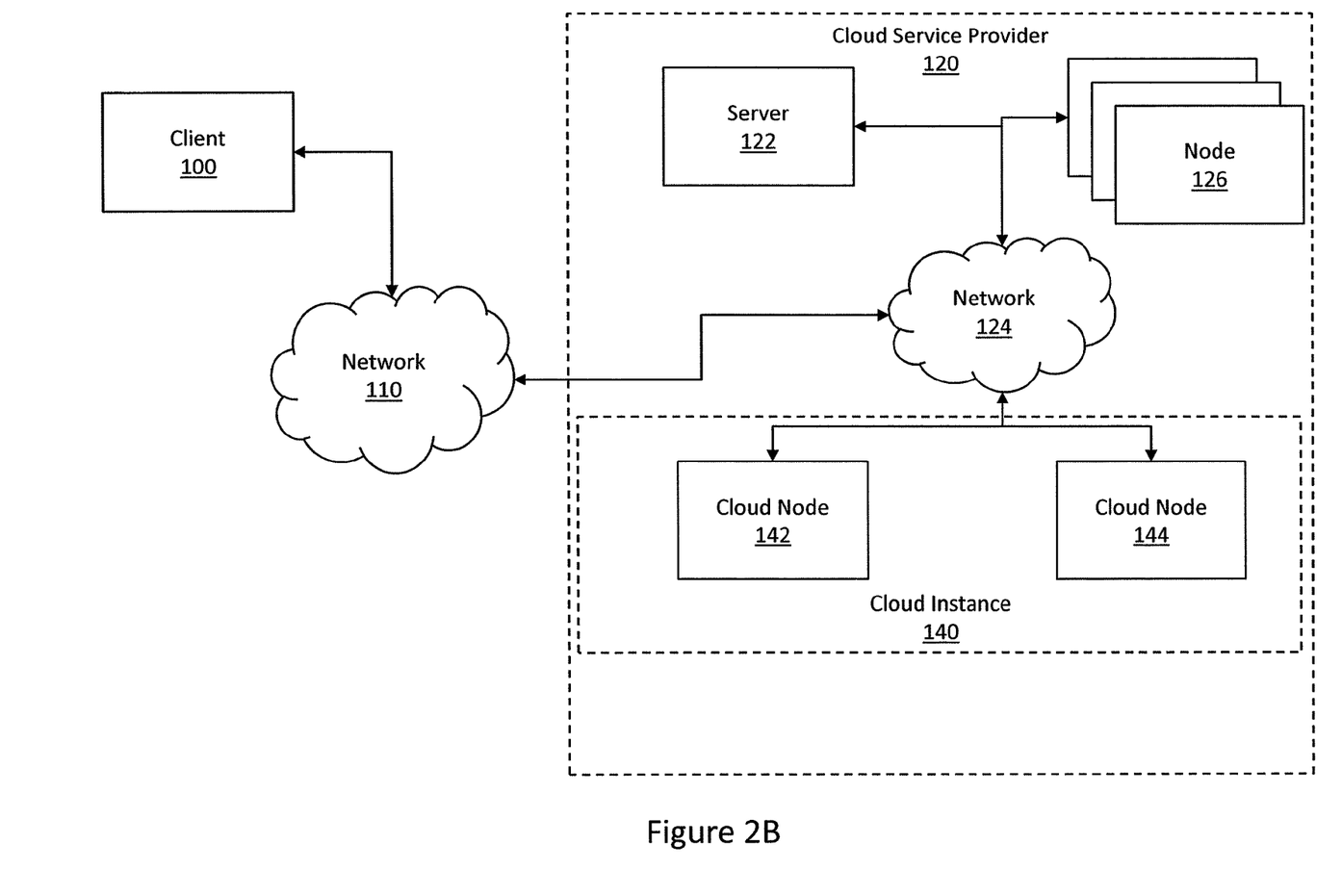
Figure 3:
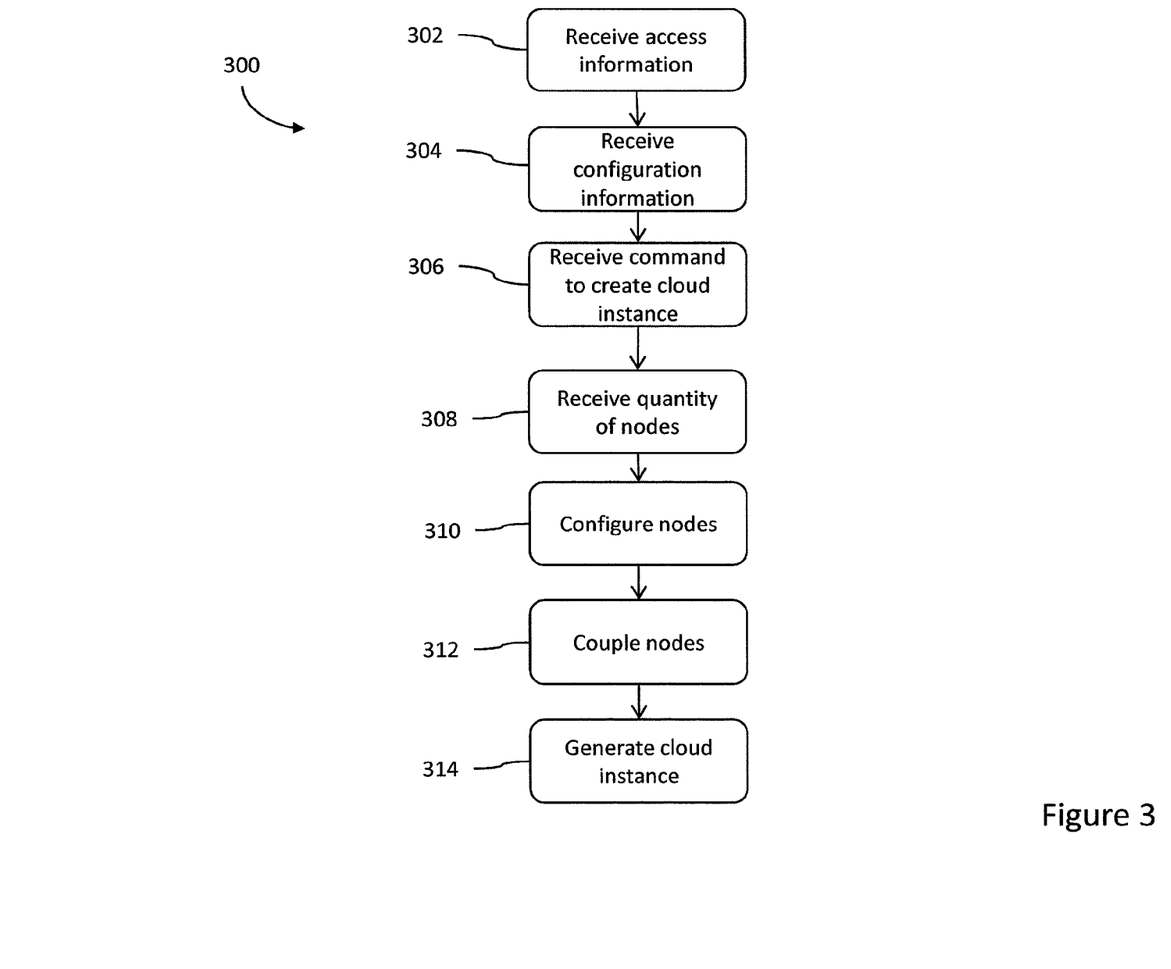
FIG. 3 shows a method for cloud management according to one embodiment.

Referring now to FIG. 3, FIG. 3 shows a method for cloud management according to one embodiment. The method 300 of FIG. 3 will be described with respect to the system 100 shown in FIG. 1B and the configured cloud instance in FIG. 2A, but is not restricted to use only on the system 100 of FIGS. 1B and 2A. Other systems according to this disclosure are also suitable for performing the method 300 of FIG. 3, such as the system shown in FIG. 1A or the configured cloud instance shown in FIG. 2B. The method 300 described in FIG. 3 is embodied within a software application written in program code configured to be executed by a processor, though in some embodiments, it may be implemented in hardware or software as described in greater detail below.

The method of FIG. 3 begins in block 302 when a user accesses the software application for cloud management according to this embodiment. For example, in this embodiment, the users access a web application using a standard web browser. In this embodiment, the software application is a web application hosted by a third party service provider on server 102, which is in communication with one or more CSPs, such as CSP 120. In some web-based embodiments, the software application may be hosted by the CSP, such as on server 122. Further, in some embodiments, the user may execute a software application for cloud management on the local computer, such as client computer 100.

After accessing the software application, the user selects a CSP in which to provision their new cloud instance and then provides access credentials for the selected CSP. For example, in one embodiment, the user selects a CSP, such as Amazon.com®, Rackspace®, or Bluelock®, and subsequently provides access credentials for an account at the selected CSP, such as a login name and secret key, access key, or other authentication token or string. In another embodiment, the user may provide access credentials for a cloud environment hosted within the user's own network. After the software application receives the access information, the method proceeds to block 304.

In block 304, the software application receives configuration information. For example, in one embodiment, the software application prompts the user to select one or more types of cloud nodes provided by the CSP. As was discussed previously, some CSPs may provide different types of nodes with different capabilities or resources. In some embodiments, the software application may also prompt the user to select the type of cloud instance to configure. For example, in some embodiments, the software application may be configured to provide a plurality of different types of cloud instances suitable for different tasks. As discussed above, in some embodiments, a CSP may allow a user to select one or more geographic regions in which to configure one or more cloud instances, such as North America, Europe, etc.

In one embodiment, the software application may be configured to provide a cloud instance type suitable for web content authoring and publishing, another cloud instance type suitable for authoring and rendering of three-dimensional graphics, a cloud instance type for high-speed data processing, and a cloud instance type for network-attached storage. Or in one embodiment, the software application may offer only a single type of cloud instance, such as web content publishing. In some embodiments, the software application may be supplied with a configuration file that specifies the configuration for a cloud instance. For example, in one embodiment, the software application receives a message comprising a cloud instance configuration. After receiving such a message, the software application may update configuration parameters for a cloud instance to be created. In a further embodiment, a user may be able to select a quantity of one or more available node software configurations for inclusion within a cloud instance. For example, as was discussed earlier, in one embodiment, a node may be configured as an authoring node, a publisher node, or a dispatcher node. In one such embodiment, a user can specify the number of nodes to configure each as an authoring node, a publisher node, or a dispatcher node. In other embodiments, different node configurations may be provided and selected by a user.

In the embodiment shown in FIG. 3, the user selects one or more node types offered by the CSP for inclusion within a cloud instance and a configuration type for the cloud instance, such as web content authoring and publishing. In addition, in one embodiment, the software application may allow a user to specify the quantity of nodes to be configured within the cloud instance. For the purposes of the embodiment shown in FIG. 3, the software application is configured to create a web content authoring cloud instance having three different node configurations within the cloud instance, as shown in the embodiment of FIG. 2A. After the software application receives the configuration information, the method proceeds to block 306.

In block 306, the software application receives a command to create the cloud instance. For example, in one embodiment, the software application provides the user with a button labeled "Create Cloud Instance" such that, when pressed, the software application receives a command to create the cloud instance. In one embodiment, as discussed above, the software application receives a message comprising configuration information. After receipt of the configuration message, the software application may automatically initiate creation of the cloud instance. After receiving the command to create the cloud instance, the method proceeds to block 308.

In block 308, the software application requests and receives a quantity of nodes from the CSP. For example, in this embodiment, the software application requests three nodes of the type specified by the user (e.g. three high-capacity nodes) from the CSP. To request the nodes, the software application may employ an API provided by the CSP for accessing resources provided by the CSP. For example, in one embodiment, CSP may provide an API with commands for logging into the CSP using access credentials, requesting one or more unallocated nodes from the CSP, requesting information about node types offered by the CSP, logging into one or more nodes allocated to the software application by the CSP, starting a node within a cloud instance, suspending a node within a cloud instance, and stopping or releasing one or more nodes that are no longer needed back to the CSP.

After requesting the one or more nodes, the software application receives one or more messages from the CSP with information regarding the nodes allocated to the software application. For example, in one embodiment, the CSP may provide network addresses, such as IP addresses, for each of the nodes allocated to the software application in response to the request for nodes. In one embodiment, the CSP may provide node identifiers and access information for each of the nodes allocated to the software application in response to the request for nodes. However, once the CSP provides the nodes to the software application, the nodes have been allocated to the software application and are no longer unallocated nodes within the CSP environment. After the software application receives the nodes, the method proceeds to block 310.

In block 310, the software application configures each of the received nodes. In this embodiment, the software application requested three nodes from the CSP and received network addresses for each of the three nodes. The software application then begins the process of configuring the nodes. In this embodiment, the software application causes each node to be configured as a cloud instance node by performing a series of installation and configuration operations. First, the software application causes a copy of a computing environment to be installed on each node received from the CSP. In this embodiment, the software application causes a copy of the Adobe CQ® package to be downloaded to the nodes to be configured as authoring and publisher nodes. The software application further causes a copy of Apache® server software to be downloaded to the node(s) to be configured as a dispatcher node. After the copy of the respective software package has been downloaded, the software is extracted and installed. After the software is installed, additional software packages are installed, if needed, such as a Java development kit (JDK).

Once the software packages are installed, a configuration script is downloaded to each node. In this embodiment, each of the three nodes is provided with a different configuration script: the first node is provided with a dispatcher configuration script, the second node is provided with an author configuration script, and the third node is provided with a publisher configuration script. After each script is copied to the respective node, the software application causes each of the scripts to be executed on their respective nodes. Thus, the first node is configured to be a dispatcher node, the second node is configured to be an author node, and the third node is configured to be a publisher node.

In some embodiments, different quantities of nodes may be configured and each node may be configured according to different software packages. For example, in one embodiment, a cloud instance may be configured to provide data processing capabilities for processing a large quantity of data. In such an embodiment a plurality of nodes may all be configured according to the same configuration such that each of the nodes is capable of performing data processing and each may be provided a portion of the data to be processed. In some embodiments, a cloud instance may be configured with only a single node. For example, an initial configuration for a cloud instance may provide basic functionality for a small number of users, but may subsequently be expanded by adding additional nodes, such as is discussed in co-pending U.S. patent application Ser. No. 13/572,321 entitled "Systems and Methods for Providing Hot Spare Nodes," filed on Aug. 10, 2012, the entirety of which is hereby incorporated by reference In the embodiment shown in FIG. 3, after each of the three nodes is configured according to its respective configuration script, the software application sets an administrator login and password. For example, the login and password may be set according to a default setting or may be set based on a login name and password provided by a user. After the administrator login and password is set, the software application configures a secure communications channel between each node and the software application. For example, in one embodiment, the software application configures an HTTPS connection between each node and the software application. In another embodiment, the software application may configure an SSH connection between each node and the software application. Still further embodiments may employ other secure communications mechanisms. In this embodiment, the software application then installs and compiles one or more Java server pages (JSP) on the publisher node. In some embodiments, the installation of JSP may be omitted or may be performed on one or more of the nodes in the cloud instance. In some embodiments, other software may be installed and executed on one or more of the nodes.

In some embodiment, one or more software applications may be installed on each node. For example, in this embodiment, a plurality of JavaScript and JSON features are installed on each node to provide monitoring, metering, and backup functionality. For example, each node may be configured to periodically provide status information to the software application for cloud management, such as processor and other resource usage. The software application may receive such information and provide the information to a user. Further, in one embodiment where the CSP charges a user based on network traffic or processor usage, the software application may receive metering information from the installed software applications.

In addition to the monitoring and other functionality related to cloud status, the software application further configures each node to allow for hot-fixes or hot patches. For example, in one embodiment, software updates for a cloud software package may become available. If each cloud node is configured to accept and install such updates on-the-fly, the cloud instance may provide more reliable operation. After each node has been configured the method proceeds to block 312.

In block 312, the nodes are coupled together. Depending on the nodes comprising the cloud instances two or more nodes may be coupled together, such as to allow communication between the nodes, to share data between the nodes, the hand off processing tasks to other nodes, etc. For example, in the embodiment shown in FIG. 2A, the nodes are coupled together to allow content created on an author node 132 to be moved to a publisher node 134 to be generally accessible on the Internet. Further, the dispatcher node 136 is coupled to the publisher node 134 to allow the dispatcher node to direct traffic to the publisher node.

In the embodiment shown in FIG. 3, to couple the nodes together, the software application creates two agents on the authoring node 132: a replication agent and a reverse replication agent. The replication agent is configured to provide content updates from the authoring node to a publisher node. In this embodiment, the replication agent is provided with a network address for the publisher node 134 such that content updates may be pushed from the authoring node to the publisher node 134, or from the publisher node 134 to the author node 132. In some embodiments having a plurality of publisher nodes 534, a corresponding plurality of replication agents and reverse replication agents is created to allow content updates to be pushed from the authoring node to the publisher node, or from the publisher nodes to the author nodes. Similarly, the reverse replication agent is also provided with a network address for the publisher node 134 such that the authoring node 132 can determine whether changes made on a publisher node 134, such as user-provided content, should be replicated on the authoring node 132 (and subsequently on other publisher nodes in the cloud instance if the instance has multiple publisher nodes). Thus, by creating and configuring the replication agent and the reverse replication agent, the authoring node 132 is coupled to the publisher node 134, in this embodiment.

In this embodiment, the software application further configures the dispatcher node 136 with a network address for the publisher node 134 and network address for the author node 132 so that the dispatcher node 136 can route web traffic to the publisher node 134 and to the author node 132 depending on the type of web traffic. In embodiments where multiple publisher nodes 134 or multiple author nodes 132 are provided, the dispatcher node 136 may be provided with network addresses for some or all of the publisher nodes 134 or some or all of the author nodes 132. Further, in an embodiment of a cloud instance 130 having multiple dispatcher nodes, each dispatcher node may be configured with network addresses for some or all of the publisher nodes 134. In some embodiments, a cloud instance may have a plurality of nodes associated with one or more node configurations, such as the publisher and author nodes of the embodiment shown in FIG. 2A. A dispatcher node according to some embodiments may be configured to provide load balancing, filtering and caching functionality between any of such nodes, such as providing load balancing for publisher nodes as discussed above, as well as load balancing for author nodes, or for other types of nodes, such as data processing nodes, rendering nodes, etc. in various other embodiments.

Figure 4A:
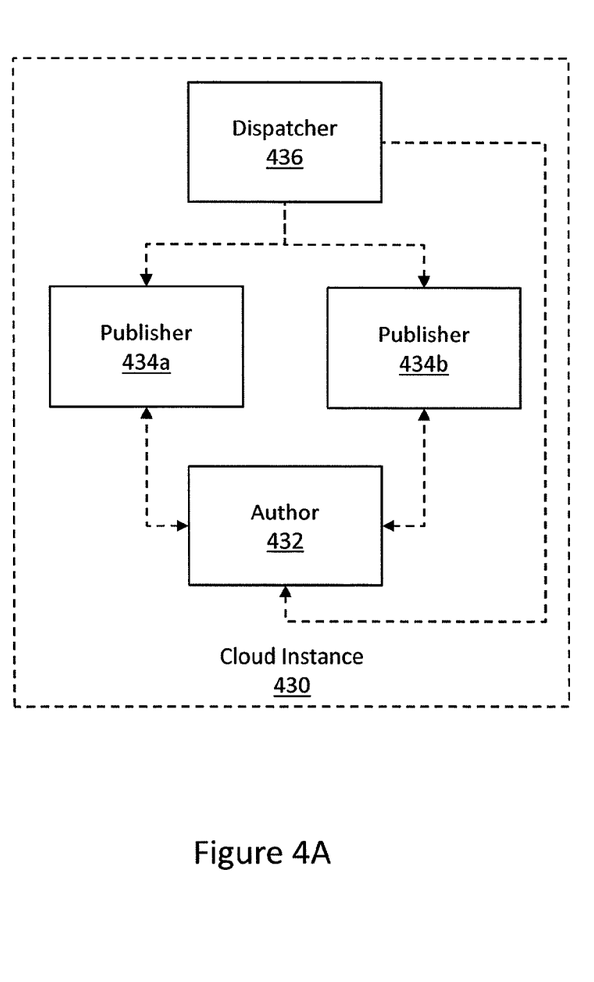
FIGS. 4A-B show embodiments of cloud instances according to embodiments.
Figure 4B:
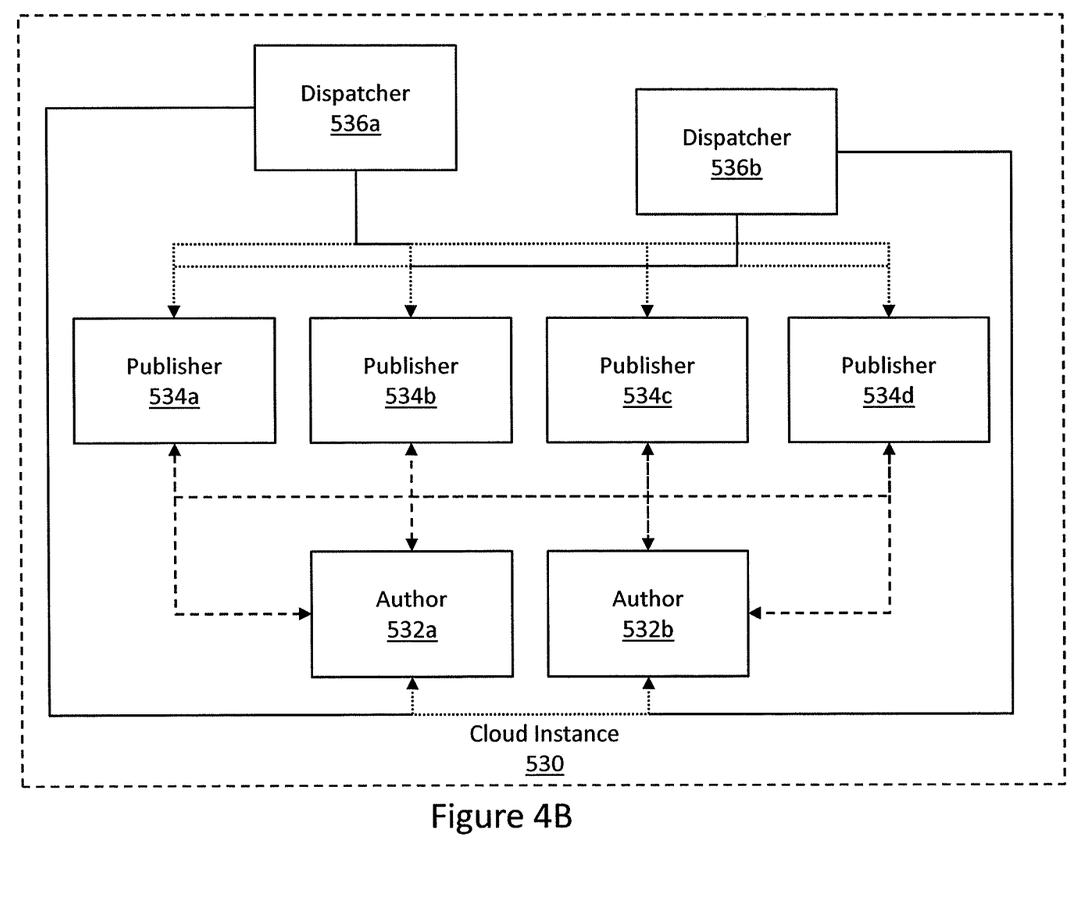

FIGS. 4A and 4B show embodiments of cloud instances according to embodiments. In FIG. 4A, the cloud instance 430 comprises 1 author node 432, 2 publisher nodes 434a-b, and 1 dispatcher node 436. As can be seen, the nodes have been coupled together. In this embodiment, the dispatcher node 136 has been configured with information about the publisher nodes 434a-b, thereby coupling the dispatcher node 436 with the publisher node, and the author node 432 has also been has been configured with information about the publisher nodes 434a-b, thereby coupling the author node to the two publisher nodes 434a-b. FIG. 4B shows a cloud instance 530 configured with 2 author nodes 532a-b, 4 publisher nodes 534a-d, and two dispatcher nodes 536a-b. As may be seen, each of the dispatcher nodes 536a-b has been coupled to each of the publisher nodes 534a-d, as has the author nodes 532a-b. Further, each of the dispatcher nodes 636a-b is coupled to each of the author nodes 634a-b and both dispatcher nodes 636a-b are configured to provide load balancing and caching to the author nodes 632a-b as well as the publisher nodes 634a-d. Still further configurations of nodes within a cloud instance may be realized in various embodiments according to this disclosure. After the nodes have been coupled together, the method proceeds to block 314.

In block 314, the cloud instance is generated and registered with the software application. In this embodiment, the software application receives one or more notifications from each of the nodes to indicate that the node is configured and coupled to the respective other nodes. Once each node is ready, the software application flags the cloud instance as generated and provides a notification to the user. In one embodiment, the software application provides a visual indicator, such as a status icon or other status indicator. In one embodiment, the software application provides an audible indicator, such as a bell or other sound. In some embodiments, the software application may send an email to a user's email address to notify the user that the cloud instance is ready.

While FIG. 3 was discussed with respect to a cloud instance embodiment shown in FIG. 2A, which comprises three particular types of nodes (author, publisher, dispatcher), other cloud instances may comprise other types of nodes. For example, the system shown in FIG. 2B generally resembles the system 100 shown in FIG. 2A; however, the cloud instances comprises two cloud nodes 142, 144. Each of these nodes has been configured according to a user's particular needs and may comprise the same or different functionality. For example, in one embodiment, a user may configure each of the plurality of nodes 142, 144 to perform graphics rendering. In another embodiment, a user may configure one node 142 to perform graphics rendering and another node 144 to provide a content creation application. In one embodiment, one or more nodes may be configured as file servers or as storage devices. And while the systems shown in FIGS. 2A-B have cloud instances comprising two or three nodes, cloud instances may a fewer number of nodes or a greater number of nodes. Further, in the embodiment shown in FIG. 2A, where there is an equal number of author, publisher, and dispatcher nodes shown in the cloud instance 130, such a configuration is not necessary. For example, different quantities of each node type may be included, including zero of one or more types. For example, in one embodiment, a cloud instance 130 comprises one publisher node, and no author or dispatcher nodes.

GENERAL

While the methods and systems herein are described in terms of software executing on various machines, the methods and systems may also be implemented as specifically-configured hardware, such a field-programmable gate array (FPGA) specifically to execute the various methods. For example, referring again to FIGS. 4 and 5, embodiments can be implemented in digital electronic circuitry, or in computer hardware, firmware, software, or in a combination of thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICS), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to "one embodiment" or "an embodiment" means that a particular feature, structure, operation, or other characteristic described in connection with the embodiment may be included in at least one implementation of the disclosure. The disclosure is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method comprising:
   receiving access information for a cloud service provider;
   receiving configuration information for a cloud instance;
   receiving a command to create the cloud instance;
   requesting and receiving a plurality of nodes from the cloud service provider;
   causing the plurality of nodes to be configured as cloud nodes, comprising causing software packages to be installed and configured on the plurality of cloud nodes;
   causing the plurality of nodes to be configured as a dispatcher node, a plurality of author nodes, and a plurality of publisher nodes, and wherein:

the author nodes are configured to produce web content, the dispatcher node is configured to provide access to the author nodes and the publisher nodes, and the publisher nodes are configured to receive the web content from the author nodes and to publish the web content for access on the Internet;

configuring the cloud nodes as a cloud instance and incorporating the plurality of cloud nodes into the cloud instance;

coupling the plurality of cloud nodes to enable communications between the plurality of cloud nodes;

installing a replication agent and a reverse replication agent on the author node, wherein the replication agent is configured to transmit one or more updates to the web content produced at one of the author nodes to the publisher node from the respective author node and to replicate the changes to the other author nodes, and wherein the reverse replication agent is configured to identify one or more user-provided content updates to the web content made at the publisher node and to retrieve the one or more user-provided content updates to the web content from the publisher node to the author nodes and to store the one or more user-provided content updates at the author nodes; and providing access to the cloud instance.

2. The method of claim 1, wherein requesting and receiving a plurality of nodes from the cloud service provider comprises requesting and receiving five nodes from the cloud service provider.

3. The method of claim 2, wherein coupling the three nodes comprises:
providing network addresses for the publisher nodes to the author nodes;
providing network addresses for the author node to the dispatcher nodes; and
providing the network addresses for the publisher nodes to the dispatcher node.

4. A non-transitory computer-readable medium comprising program code for causing a processor to execute a method, the program code comprising:
program code for receiving access information for a cloud service provider;
program code for receiving configuration information for a cloud instance;
program code for receiving a command to create the cloud instance;
program code for requesting and receiving a plurality of nodes from the cloud service provider;
program code for causing the plurality of nodes to be configured as cloud nodes, comprising causing software packages to be installed and configured on the plurality of cloud nodes;
program code for causing the plurality of nodes to be configured as a dispatcher node, a plurality of author nodes, and plurality of publisher nodes, and wherein the author nodes are configured to produce web content, the dispatcher node is configured to provide access to the author nodes and the publisher nodes, and the publisher nodes are configured to receive the web content from the author node and to publish the web content for access on the Internet;
program code for configuring the cloud nodes as a cloud instance and incorporating the plurality of cloud nodes into the cloud instance;
program code for coupling the plurality of cloud nodes to enable communications between the plurality of cloud nodes;
program code for installing a replication agent and a reverse replication agent on the author node, wherein the replication agent is configured to transmit one or more updates to the web content produced at one of the author nodes to the publisher node from the respective author node and to replicate the changes to the other author nodes, and wherein the reverse replication agent is configured to identify one or more user-provided content updates to the web content made at the publisher node and to retrieve the one or more user-provided content updates to the web content from the publisher node to the author node and to store the one or more user-provided content updates at the author node; and
program code for providing access to the cloud instance.

5. The non-transitory computer-readable medium of claim 4, wherein the program code for requesting and receiving a plurality of nodes from the cloud service provider comprises program code for requesting and receiving five nodes from the cloud service provider.

6. The non-transitory computer-readable medium of claim 5, wherein the program code for coupling the plurality of nodes comprises:
program code for providing network addresses for the publisher nodes to the author nodes,
program code for providing network addresses for the author node to the dispatcher nodes; and
program code for providing the network addresses for the publisher nodes to the dispatcher node.

7. The non-transitory computer-readable medium of claim 5, further comprising program code for, prior to providing access to the cloud instance, causing a java server pages (JSP) to be installed on the publisher node and compiling the JSP.

8. A system comprising:
a non-transitory computer-readable medium; and
a processor in communication with the computer-readable medium, the processor configured to:
receive access information for a cloud service provider;
receive configuration information for a cloud instance;
receive a command to create the cloud instance;
request and receiving a plurality of nodes from the cloud service provider;
cause the plurality of nodes to be configured as cloud nodes, comprising causing software packages to be installed and configured on the plurality of cloud nodes;
cause the plurality of nodes to be configured as a dispatcher node, a plurality of author nodes, and a plurality of publisher nodes, and wherein the author nodes are configured to produce web content, the dispatcher node is configured to provide access to the author nodes and the publisher nodes, and the publisher nodes are configured to receive the web content from the author node and to publish the web content for access on the Internet;
configure the cloud nodes as a cloud instance and incorporating the plurality of cloud nodes into the cloud instance;
couple the plurality of cloud nodes to enable communications between the plurality of cloud nodes;
install a replication agent and a reverse replication agent on the author node, wherein the replication agent is configured to transmit one or more updates to the web content produced at one of the author nodes to the publisher node from the respective author node and to replicate the changes to the other author nodes, and wherein the reverse replication agent is configured to identify one or more user-provided content updates to the web content made at the publisher node and to retrieve the one or more user-provided content updates to the web content from the publisher node to the author node and to store the one or more user-provided content updates at the author node; and provide access to the cloud instance.

9. The system of claim 8, wherein the processor is further configured to request and receive five nodes from the cloud service provider.

10. The system of claim 9, wherein the processor is further configured to, prior to providing access to the cloud instance, cause a java server pages (JSP) to be installed on the publisher node and compiling the JSP.

11. The system of claim 9, wherein the processor is configured to:

provide network addresses for the publisher nodes to the author nodes, provide network addresses for the author node to the dispatcher nodes; and provide the network addresses for the publisher nodes to the dispatcher node.

* * * * *